(12) United States Patent
Zheng et al.

(10) Patent No.: US 8,879,552 B2
(45) Date of Patent: Nov. 4, 2014

(54) PRECISION TIME PROTOCOL OFFLOADING IN A PTP BOUNDARY CLOCK

(75) Inventors: Qun Zheng, Surrey (CA); Thomas Geyer, Langley (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 171 days.

(21) Appl. No.: 13/402,773

(22) Filed: Feb. 22, 2012

(65) Prior Publication Data

US 2013/0215889 A1  Aug. 22, 2013

(51) Int. Cl.
 *H04L 12/28* (2006.01)
 *H04J 3/06* (2006.01)

(52) U.S. Cl.
 CPC .................................. *H04J 3/0667* (2013.01)
 USPC ............ 370/390; 370/252; 370/350; 370/419

(58) Field of Classification Search
 None
 See application file for complete search history.

(56) References Cited

U.S. PATENT DOCUMENTS

| | | | |
|---|---|---|---|
| 7,773,606 B2 * | 8/2010 | Dobjelevski et al. ..... | 370/395.62 |
| 8,223,648 B2 * | 7/2012 | Zheng ......................... | 370/236.2 |
| 2008/0069150 A1 * | 3/2008 | Badt et al. ..................... | 370/503 |
| 2010/0058101 A1 * | 3/2010 | Shahid et al. ................. | 713/500 |
| 2011/0158120 A1 * | 6/2011 | Hamasaki et al. ............ | 370/252 |
| 2011/0261917 A1 * | 10/2011 | Bedrosian ..................... | 375/371 |

OTHER PUBLICATIONS

IEEE Standard for a Precision Clock Synchronization Protocol for Networked Measurement and Control Systems, Jul. 24, 2008 (Revision of IEEE Std 1588-2002) IEEE Instrumentation and Measurement Society Sponsored by the Technical Committee on Sensor Technology (TC-9).*
IEEE-1588 2008—IEEE Standard for a Precision Clock Synchronization Protocol for Networked Measurement and Control System, IEEE, Jul. 24, 2008, the whole document.
Pinchas, M. et al. "A Combined PTP and Circuit-Emulation System", Oct. 1, 2007, pp. 143-147, 2007 International IEEE Symposium on Precision Clock Synchronization (ISPCS) for Measurement, Control and Communication, Vienna Austria.

* cited by examiner

*Primary Examiner* — Ian N Moore
*Assistant Examiner* — Latresa McCallum

(57) ABSTRACT

In a data network node implementing the Precision Time Protocol, low-touch PTP packet processing functions are moved from a PTP processing unit into an efficient network processor. An example network node thus includes a time-transfer protocol processing unit that generates negotiation messages and management messages for a time-transfer protocol and forwards said negotiation and management messages to one or more clients. The network node also includes a separate network processor unit, which is adapted to: receive a configuration message from the time-transfer protocol processing unit, the configuration message comprising stream configuration data for a first type of repetitive time-transfer message; generate a plurality of time-transfer messages according to the first type of repetitive time-transfer message, using the stream configuration data; and forward said plurality of time-transfer messages to the one or more remote network nodes, via the one or more line ports.

8 Claims, 14 Drawing Sheets

PRECISION TIME PROTOCOL OFFLOADING IN A PTP BOUNDARY CLOCK

BACKGROUND

The present invention generally relates to systems for synchronizing clocks in a computer network, and is more particularly related to techniques for improving time-transfer processing capacity in a network node that provides time-transfer protocol services to other network nodes.

Precision Time Protocol (PTP), as defined in the IEEE-1588-2008 standard entitled "Standard for a Precision Clock Synchronization Protocol for Networked Measurement and Control Systems," enables precise synchronization of clocks over a data packet network. In a nutshell, PTP is used to distribute a "grandmaster" clock's precise time-of-day to slave clocks. This is done using an exchange of PTP packets, which include timestamps carried inside. Slave clocks adjust these timestamps to account for end-to-end delay, and can obtain a local time-of-day aligned to the grandmaster with sub-microsecond precision, in some cases.

The IEEE 1588 standards describe a hierarchical master-slave architecture for clock distribution. In this architecture, an "ordinary clock" is a device having a single network connection. An ordinary clock can be the source of a synchronization reference, in which case it is known as a "master." Alternatively, an ordinary clock can be the destination of a synchronization reference, in which case it is known as a "slave." In contrast, a "boundary clock" has multiple network connections and can transfer synchronization from one network segment to another. The root timing reference in a system is called the "grandmaster." The grandmaster transmits synchronization information to slave clocks residing on its network segment. These slave clocks may include one or more boundary clocks, which can then transfer synchronized time to other clocks for which the boundary clocks serve as masters.

While PTP messages are generally sent using multicast messaging, IEEE 1588-2008 includes specifications to allow a master clock to negotiate unicast transmission on a port-by-port basis. PTP messages used by ordinary and boundary clocks include Sync, Delay_Req, Follow_Up and Delay_Resp messages, which are used to transfer time-related information across the network. Additional message types are used by so-called "transparent clocks," to measure delays across the network for improved correction of transferred time-of-day. These include Pdelay_Req and Pdelay_Resp messages. Announce messages are used in a so-called "best master clock algorithm" (BMCA) to determine the configuration of the master-slave hierarchy in a network, and to select the grandmaster. Announce messages in particular are used by the best master clock algorithm in IEEE 1588-2008 to build a clock hierarchy and select the grandmaster. Additional management and signaling messages are used to configure and maintain the PTP system.

Some PTP message types are time-critical, in that they must be accurately time-stamped on transmission or receipt. These messages, which are known as "event" messages and are generally repeated many times, include the Sync, Delay_Req, Pdelay_Req and Pdelay_Resp messages. Other non-time-critical PTP messages are known as "general" messages. These include the Announce, Follow_Up, Delay_Resp, Pdelay_Resp_Follow_Up, messages, as well as the management and signaling messages.

Each master port of a PTP boundary clock (BC) may require providing service to a number of slave clients. The total number of the clients a PTP master port can support is limited by the computational power of the processor that is running the PTP protocol stack for the PTP ports. This is especially true if unicast transport to and from each slave is used. Accordingly, improved techniques are needed for implementing PTP in a boundary clock.

SUMMARY

In several embodiments of the invention, the efficient packet handling capability of a network processor is more fully exploited by moving the higher-rate, lower-touch, PTP packet processing functions of a PTP boundary clock master port from the PTP Protocol Engine into the network processor. Doing so can reduce the general purpose processor's burden by as much as 95%, thus dramatically improving the boundary clock's fan-out capabilities. Low-touch functionality includes repetitive, high-rate message generation functions, such as the generation of Sync and Delay_Resp messages. High-touch functionality includes the higher-level, less frequently performed tasks performed by a PTP master port function, such as unicast negotiation, generation and processing of management messages, and the like. By moving the low-touch functionality into an efficient network processing unit, the processing load on the PTP processor can be dramatically reduced.

An example method according to several embodiments of the invention is implemented in a network node having a time-transfer protocol processing unit and a network processor unit consisting of separate hardware resources from the time-transfer protocol unit. Negotiation messages and management messages for the time-transfer protocol are generated, using the time-transfer protocol processing unit, and forwarded to one or more remote network nodes. Routing or switching operations are performed, using the network processor unit, on data packets received from one or more line ports and transmitted on one or more backplane ports and data packets received from the one or more backplane ports and transmitted on the one or more line ports, wherein the data packets do not include time-transfer protocol timestamp data. A configuration message is transferred from the time-transfer protocol processing unit to the network processor unit, the configuration message comprising stream configuration data for a first type of repetitive time-transfer message. The network processor unit generates a plurality of time-transfer messages according to the first type of repetitive time-transfer messages, using the stream configuration data, and forwards the time-transfer messages to the one or more remote network nodes, via the one or more line ports.

Embodiments of the invention also include apparatus corresponding to the method summarized above. Thus, an example network node includes a time-transfer protocol processing unit adapted to generate negotiation messages and management messages for a time-transfer protocol and to forward said negotiation and management messages to one or more remote network nodes. The network node further includes a network processor unit consisting of separate hardware resources from the time-transfer protocol processing unit. The network processor unit is adapted to: perform routing operations, or switching operations, or both, on first data packets received from one or more line ports and transmitted on one or more backplane ports and second data packets received from the one or more backplane ports and transmitted on the one or more line ports, wherein the first and second data packets do not include time-transfer protocol timestamp data; receive a configuration message from the time-transfer protocol processing unit, the configuration message comprising stream configuration data for a first type of repetitive time-transfer message; generate a plurality of time-transfer messages according to the first type of repetitive time-transfer message, using the stream configuration data; and forward said plurality of time-transfer messages to the one or more remote network nodes, via the one or more line ports.

In several embodiments according to the apparatus and method summarized above, the configuration message includes additional stream configuration data corresponding to one or more additional types of repetitive time-transfer messages. The network processor unit in these embodiments is further adapted to generate additional time-transfer messages of each of the one or more additional types and to forward the additional time-transfer messages to the one or more remote network nodes.

In some embodiments, the time-transfer protocol is compliant with the Precision Clock Synchronization Protocol specified by IEEE Standard 1588-2008. In some of these embodiments, the first type of time-transfer message is one of the following types specified by IEEE Standard 1588-2008: an Announce message; a Sync message; a Follow_Up message; and a Delay_Resp message.

In several embodiments, the network processor unit is adapted to generate the plurality of time-transfer messages of the first type by inserting incremented sequence identifiers into successive ones of the time-transfer messages. In some of these embodiments, the time-transfer messages of the first type each comprise a time-transfer protocol field that is copied from the stream configuration data and unchanged by the network processor unit. In various instances, the time-transfer protocol field is one of a clock quality field, a priority field, and a universal time offset field.

Of course, the present invention is not limited to the above-summarized features and advantages. Indeed, those skilled in the art will recognize additional features and advantages upon reading the following detailed description, and upon viewing the accompanying drawings.

DETAILED DESCRIPTION

The invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Thus, components or features from one embodiment may be assumed to be present or used in another embodiment, where such inclusion is suitable.

For purposes of illustration and explanation only, several embodiments of the present invention are described herein in the context of a network node that uses the Precision Time Protocol (PTP). It will be understood, however, that the present invention is not limited to such embodiments and may be implemented in connection with other time-transfer protocols, whether those protocols are related to the IEEE 1588-2008 standard or not.

Each master port of a PTP boundary clock (BC) may require providing service to a number of slave clients. The total number of the clients a PTP master port can support is limited by the computational power of the processor running PTP protocol stack for the PTP ports, especially if unicast transport to and from each slave is used. In general, a processing power of approximately 17 Dhrystone MIPS (DMIPS) is required for a master port to provide the service to a single PTP unicast. Thus, for example, given a 300 MHz MPC8260 Power QUICC II™ processor, 33 unicast clients would saturate the processor. In a typical system, this processor would have other tasks, including overhead tasks that would also consume central-processing-unit (CPU) cycles. Still further, it should be noted that this analysis assumes one-step communications with a Sync/Delay_Req rate of 64/16. For two-step hardware, or for increased Sync/Delay_Req rates, the CPU utilization would increase, which would lower the number of the clients supported even further.

Unicast client device fan-out is important for boundary clocks when used for synchronization in a telecommunications environment. In general, as the fan-out improves, fewer boundary clocks are required. Therefore, it is beneficial to increase the number of clients that can be serviced by a single instance of the PTP protocol stack in a boundary clock.

Figure 1:
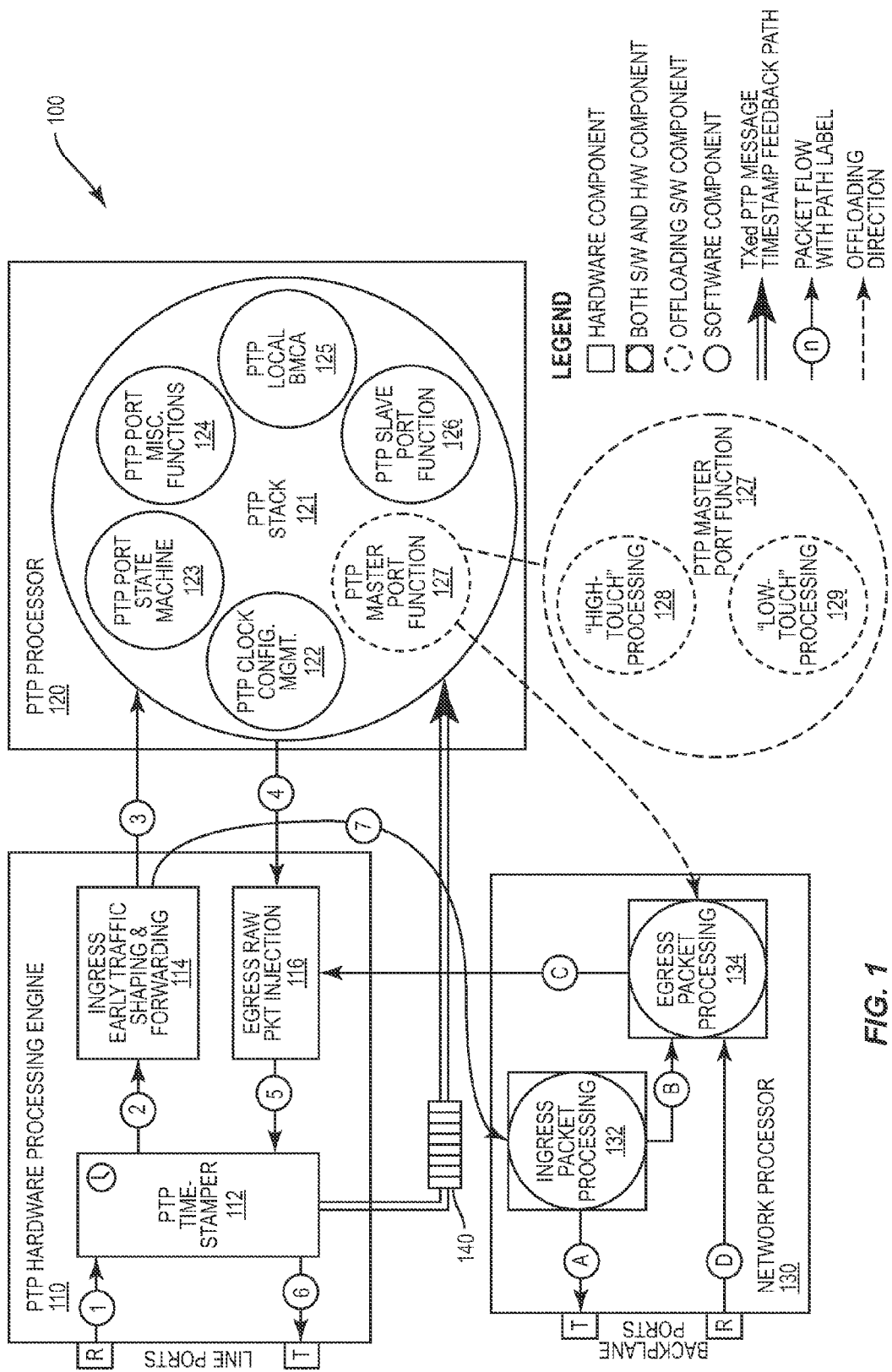
FIG. 1 is a block diagram illustrating some of the components of a data network node configured to support the Precision Time Protocol.

Turning now to the drawings, FIG. 1 illustrates an example of a data network node 100 that includes PTP boundary clock functionality. As shown in FIG. 1, a regular network device with PTP boundary clock capability typically comprises four main components: a PTP Hardware Processing Engine 110, a PTP Processor Unit (PPU) 120, a Network Processor Unit (NPU) 130, and a transmit (TX)-timestamp FIFO unit 140.

PTP Hardware Processing Engine 110 is used to classify and timestamp incoming and outgoing PTP event messages. It includes a PTP Time-stamper 112, which identifies PTP packets of interest to network node 100, both incoming and outgoing, and time-stamps them. Other packets, whether packets unrelated to PTP or PTP messages intended for other nodes, are not time-stamped by PTP Time-stamper 112. In the incoming direction, i.e., for those packets received at network node 100, the timestamp is usually inscribed in the message. In the transmit direction, i.e., for outgoing packets, the timestamp is typically pushed to FIFO 140, together with a PTP message identifier. This is done, for example, for two-step Sync messages sent by a port acting as a PTP master, and for Delay_Req messages sent by a port acting as a PTP slave, and is also done for Pdelay_Req, Pdelay_Resp, and Pdelay_Resp_Follow_Up messages in a node acting as a transparent clock. The PTP message identifier accompanying the timestamp may be a combination of several fields in a PTP message, which can be used to uniquely identify the corresponding PTP message.

PTP Hardware Processing Engine 110 may also include an Ingress Early Traffic Shaping and Forwarding hardware engine 114 and an Egress Raw Packet Injection Engine 116. However, these functional units may be included in NPU 130 in some embodiments. The Ingress Early Traffic Shaping and Forwarding engine 114 is primarily used to allow PTP messages of interest to be redirected to PPU 120, as opposed to the regular forwarding of non-PTP-related packets to NPU 130 for normal traffic handling. If the Ingress Early Traffic Shaping and Forwarding functionality resides on NPU 130, on the other hand, it serves to intercept PTP messages for redirection to PPU 120. Whether Ingress Early Traffic Shaping and Forwarding engine 114 is located in PTP Hardware Processing Engine 110 or in NPU 130 is an implementation choice. Egress Raw Packet Injection unit 116 is used to inject packets to different line ports, and may include a queuing mechanism. Like Ingress Early Traffic Shaping and Forwarding hardware engine 114, Egress Raw Packet Injection unit 116 can also reside on NPU 130.

PPU 120 is normally implemented using a general purpose processor and corresponding software, and carries out the PTP protocol, which is embodied in the system pictured in FIG. 1 as PTP Stack 121. As noted earlier, in conventional implementations, as illustrated in FIG. 1, the PTP protocol can be extremely CPU-intensive.

Generally speaking, PTP Stack 121 handles PTP client requests and/or responds back to the client with the protocol defined operations. As shown in FIG. 1, there are several sub-components in PTP Stack 121. First, a PTP Clock Configuration Management function 122 provides basic PTP clock and port configuration control. PTP Port State Machine 123 is a runtime state machine to maintain PTP ports. PTP Local BMCA function 125 provides the PTP-defined Best Master Clock Algorithm for the PTP ports covered by PTP Stack 121. PTP Slave Port Function 126 receives services from a remote master port for time synchronization. PTP Miscellaneous Functions 124 covers miscellaneous functions such as handling statitics and monitoring the overall system. Finally, PTP Stack 121 includes PTP Master Port Function 127, which provides services to remote clients to deliver PTP messages, which include Announce, Sync (and Follow_Up in two-step case), and Delay_Resp (if the clients use Delay_Req). PTP Master Port Function 127 also provides some management and signaling functions such as unicast negotiation.

The above mentioned four types of PTP messages have the following traits. First they are mostly repetitive operations, with minor differences in each round. That is, they require very low-logic processing. Second, they are very "chatty," i.e. occurring at a very high rate, since for each client hundreds of message must be delivered per second, in a timely fashion, depending on the client requests. Further, the precision of the repetition period for these messages needs to be in single digit of milliseconds level, with high confidence. It is estimated that for a fully unicast model, the delivery of these four types of messages consumes more than 95% of the total master port function CPU consumption. To simplify the subsequent description, these four types of messages are called PTP Event-Related Messages (PERM) herein. This term should not be confused, however, with the term "event messages," which has a narrower meaning in the PTP standards.

The primary purpose of NPU 130 is to support non-PTP related routing/switching network functions, which include Ingress Packet Processing 132 and Egress Packet Processing 134. These functions require very high bandwidth to maintain high throughput for network node 100. Thus, the bulk of NPU 130's capacity is focused on less "intelligent" jobs, each of which can be performed with relatively few operations.

Ingress Packet Processing unit 132 receives "regular" packets from the network, and forwards them to backplane ports or locally (i.e., to Egress Packet Processing unit 134) as specified by configuration data stored in NPU 130. As noted earlier, in some embodiments Ingress Packet Processing Unit 132 may include Ingress Early Traffic Shaping & Forwarding unit 114.

Egress Packet Processing unit 134 receives regular packets from backplane ports or locally (i.e., from Ingress Packet Processing unit 132) and sends the packets to the line ports for transmission to other network nodes. As noted earlier, in some embodiments Egress Packet Processing Unit 134 may include Egress Raw Packet Injection unit 116.

Hardware FIFO 140 is used to carry time-stamps for transmitted PTP event messages. These time-stamps allow PPU 120 to determine precisely when a given PTP message was sent. Note that the timestamp record in the FIFO includes not just the time-stamp itself, but also the PTP message identifier (which may be hashed, in some embodiments) to uniquely identify the sending packet that a given time-stamp corresponds to. This identifier may include, but is not limited to: a PTP internal stream ID; a message type; a sequence ID; and/or a transport ID, such as IP address and VLAN Tag.

Figure 2A:
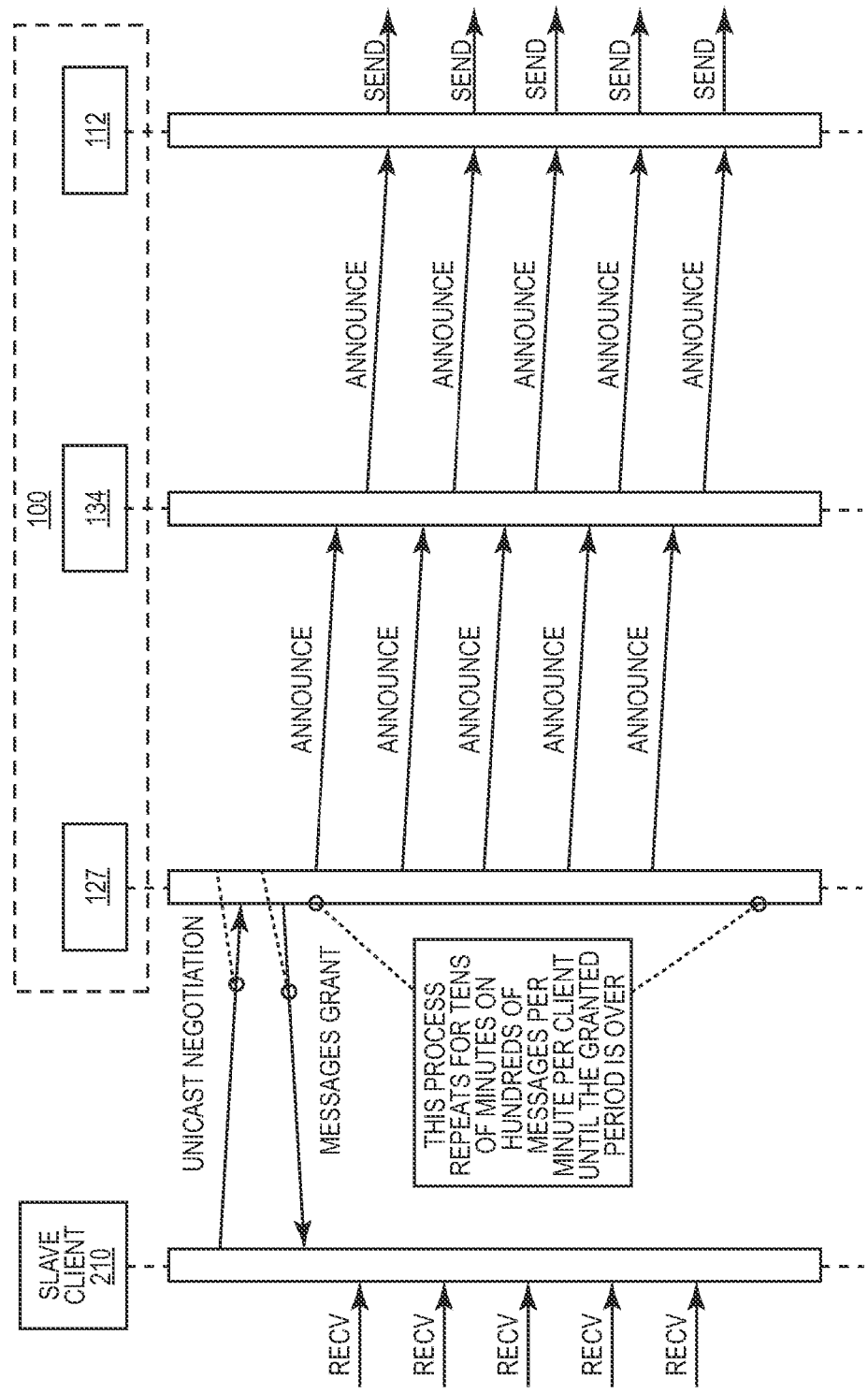
FIGS. 2A, 2B, and 2C illustrate the normal handling of PTP Announce, Sync and Follow_Up, and Delay_Resp messages.
Figure 2B:
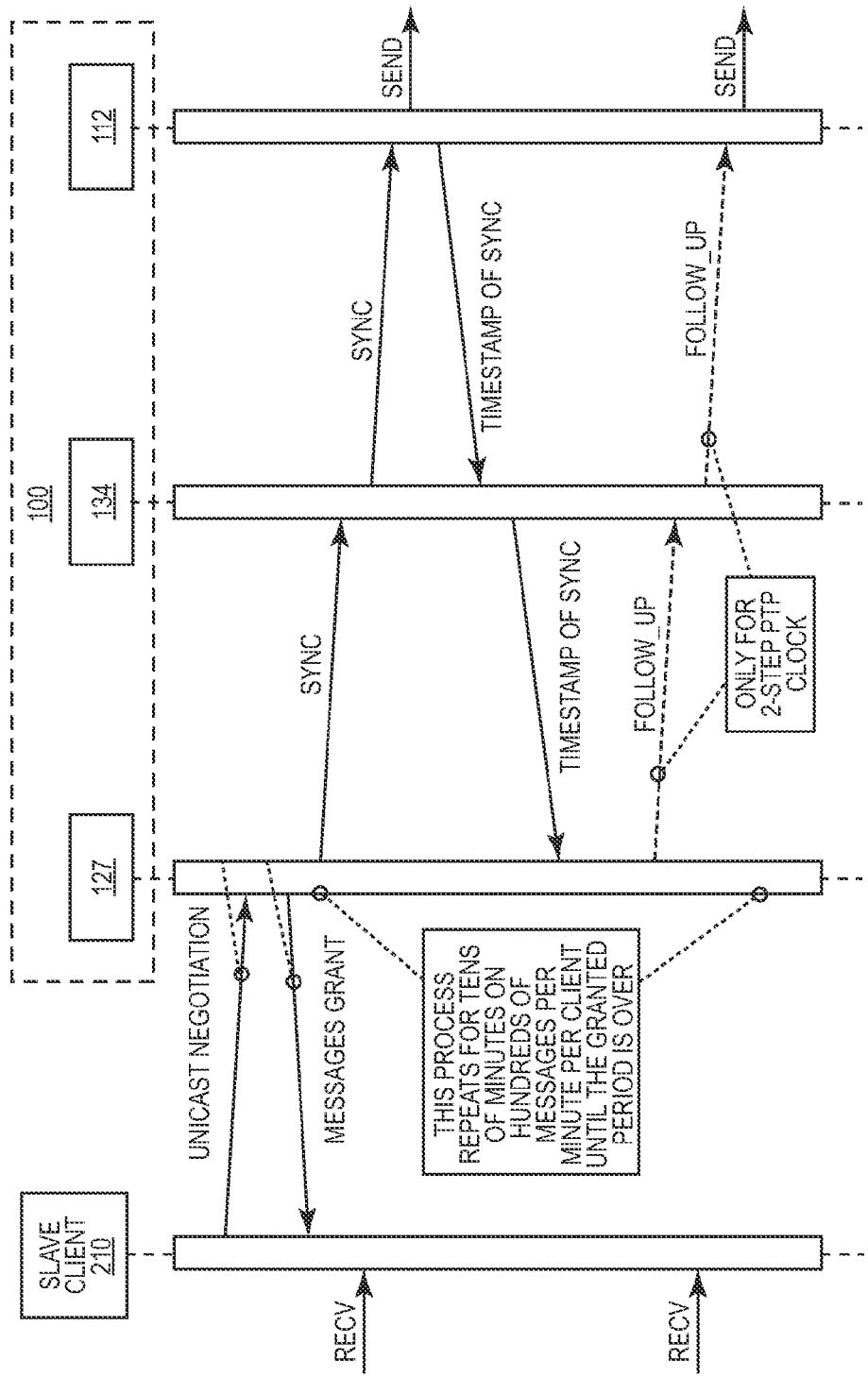
Figure 2C:
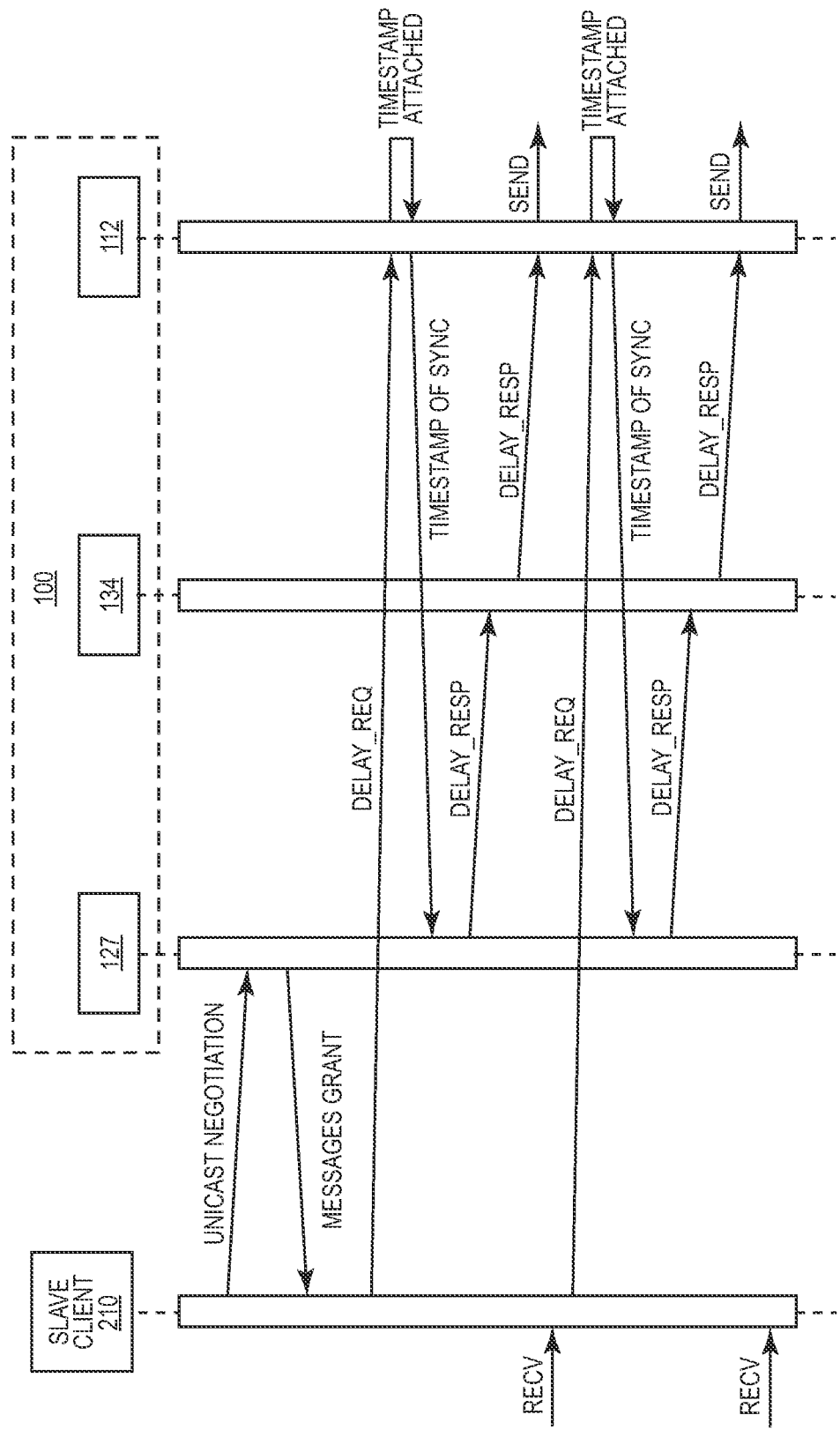

FIGS. 2A, 2B, and 2C illustrate normal processing of PTP messages in a network node 100 acting as a PTP master port, serving slave client 210. More particularly, FIG. 2A illustrates processing of Announce messages. As can be seen in the figure, which omits any illustration of non-PTP-related packet handling, the process begins with a unicast negotiation between the slave client 210 and the PTP Master Port Function 127, which resides in PPU 120 (see FIG. 1). A series of Announce messages are then generated by Master Port Function 127 and sent to slave client 210. This process continues for as many as tens of minutes, at rates as high as several hundreds of messages per second, until the negotiated period is over. In a telecom environment, for example, typical per-slave client rates are 8 messages per second for Announce messages, 64 messages per second for Sync and Follow_Up messages, and 16 messages per second for Delay_Req and Delay_Resp messages. The maximum rates can be higher than these, and are subject to change as standards progress. In most cases, this process is repeated.

Each Announce message passes from Master Port Function 127 to the Egress Packet Processing unit 134 in NPU 130. From there it is passed to PTP Time-stamper 112, before finally being relayed to slave client 210.

FIG. 2B illustrates a similar process for the handling of Sync messages, which are time-critical event messages. As was the case with Announce messages, hundreds of Sync messages may be sent per minute, for periods lasting as many as tens of minutes. With the Sync messages, however, additional processing by the PPU 120 may be necessary, since in two-step mode each Sync message is time-stamped by Time-Stamper 112 and the time-stamps are sent back to the Master Port Function 127, via FIFO 140, for processing.

Also shown in FIG. 2B are a series of Follow_Up messages. These are used only in two-step mode, and carry a time-stamp for a corresponding one of the earlier sent Sync messages. In one-step mode, a precise time-stamp is inserted into the Sync message itself and no follow-up message is needed.

FIG. 2C illustrates a process for the handling of Delay_Req messages, which are also time-critical event messages. Each Delay_Req message is time-stamped upon receipt, by PTP Time-stamper 112. The time-stamp is used by PTP Master Port Function 127 to calculate a slave-to-master time difference, by comparing the time-stamp for receipt with the time-stamp for transmission included in the Delay_Req message by slave client 210. The PTP Master Port Function 127 generates a Delay_Resp message, and forwards it to slave client 210, via the Egress Packet Processing unit 134 in NPU 130 and PTP Hardware Processing Engine 110.

As can be seen in the FIGS. 2A, 2B, and 2C, every PTP message related to the master port is processed, or "touched," by PTP Processor 120. Because of the large quantity of messages and the high repetition rate, this processing is a major component of the total processing load on PTP Processor 120.

Many network nodes, such as high-performance routers and switches, utilize network processors that provide efficient low-touch processing for every packet. These network processors are purpose-built to provide high-performance packet processing and forwarding. In FIG. 1, NPU 130 is such a processor.

In addition, these routers or switches also have general processing units for providing "high-touch" operations on packets. The network processor typically forwards high-touch packets to the general purpose processor, and accepts high-touched packets from the general processor for insertion into the data stream. Conventional PTP protocol engines available today treat all PTP messages as high-touch, performing all packet processing and generation in the general purpose processor.

It should be noted that the bandwidth required for PTP messages on a boundary clock master port is negligible compared to the overall data bandwidth of a gigabit Ethernet port, even as the processing capacity of the PTP processing unit is consumed by the high-touch processing of the PTP messages. For example, given one-hundred typical PTP clients, the PTP messages consume less than 0.1% of the overall data bandwidth of a gigabit Ethernet port. At the same time, as noted earlier, supporting only 33 unicast clients can consume all of the computation resources of a typical processor used for running the PTP protocol.

In several embodiments of the invention, the efficient packet handling capability of a network processor is more fully exploited by moving the higher-rate, lower-touch, PTP packet processing functions of a PTP boundary clock master port from the PTP Protocol Engine into the network processor. Doing so can reduce the general purpose processor's burden by as much as 95%, thus dramatically improving the boundary clock's fan-out capabilities.

Referring back to FIG. 1, it can be seen that the PTP Master Port Function 127 can be divided into two distinct sets of functionality, "high-touch" processing functionality 128, and "low-touch" processing functionality 129. Low-touch functionality 129 includes the repetitive, high-rate message generation functions, such as the generation of Sync and Delay_Resp messages. High-touch functionality 128, includes the higher-level, less frequently performed tasks performed by the PTP Master Port Function 127, such as unicast negotiation, generation and processing of management messages, and the like. By moving the low-touch functionality 129 into an efficient network processing unit, the processing load on the PTP processor can be dramatically reduced.

Figure 3:
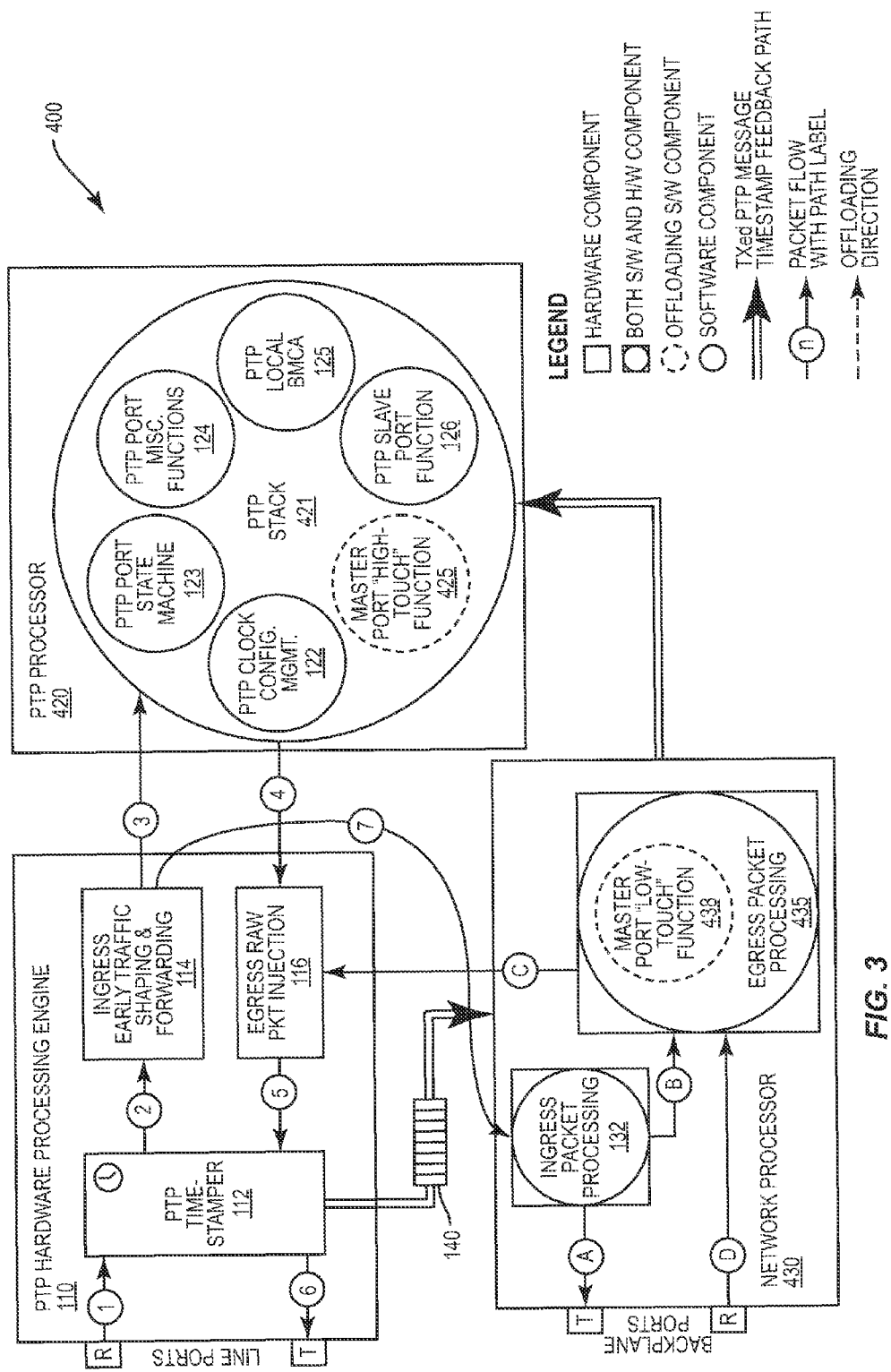
FIG. 3 is a block diagram illustrating some of the components of a data network node having an offloaded master port function.

FIG. 3 illustrates an example of a data network node embodying this approach. Data network node 400 is similar to data network node 100 (FIG. 1) in several respects, and includes an identical PTP Hardware Processing Engine 110 and FIFO 140. Furthermore, Network Processor 430 includes an Ingress Packet Processing unit 132 that is unchanged from the similar unit in FIG. 1. However, the Egress Packet Processing 435 in NPU 430 has been modified, compared to its counterpart in FIG. 1. In NPU 430, Egress Packet Processing unit 435 includes Master Port low-touch processing functionality 438, which has been severed from the PTP Processor 420. The high-touch processing portion of the Master Port functionality remains in PTP Processor 420, as the Master Port high-touch processing component 425 of PTP Stack 421.

In some embodiments, this "offloading" of the low-touch PTP functionality is performed for all of the PTP Event-Related Messages (PERM) for a PTP master port. Based on offloading logic differences, PERM can be further divided into 2 categories: Announce and Sync as PERM-A, and Follow_Up and Delay_Resp as PERM-B.

Figure 4A:
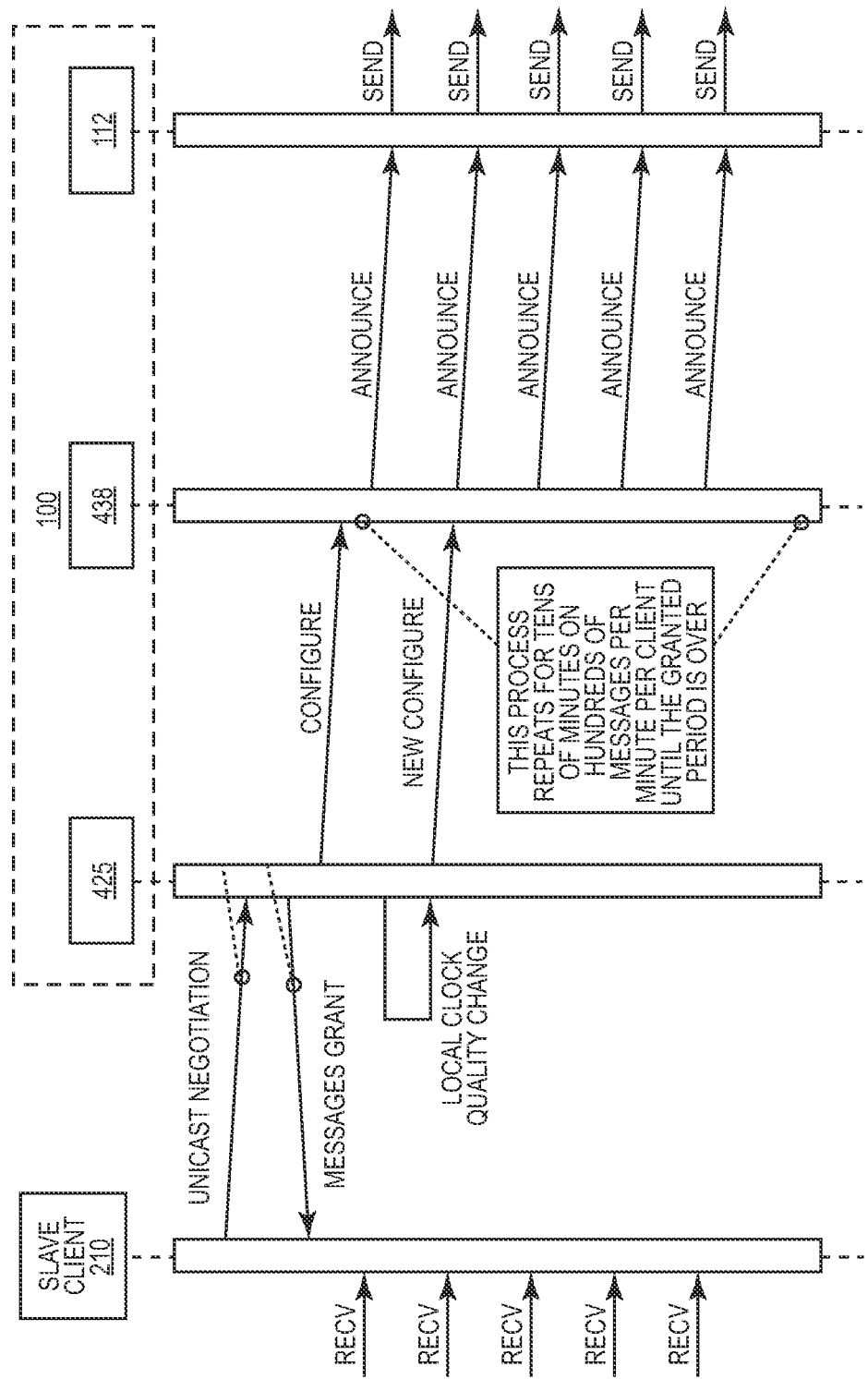
FIGS. 4A, 4B, and 4C illustrate the handling of PTP Announce, Sync and Follow_Up, and Delay_Resp messages, using an offloaded master port function.
Figure 4B:
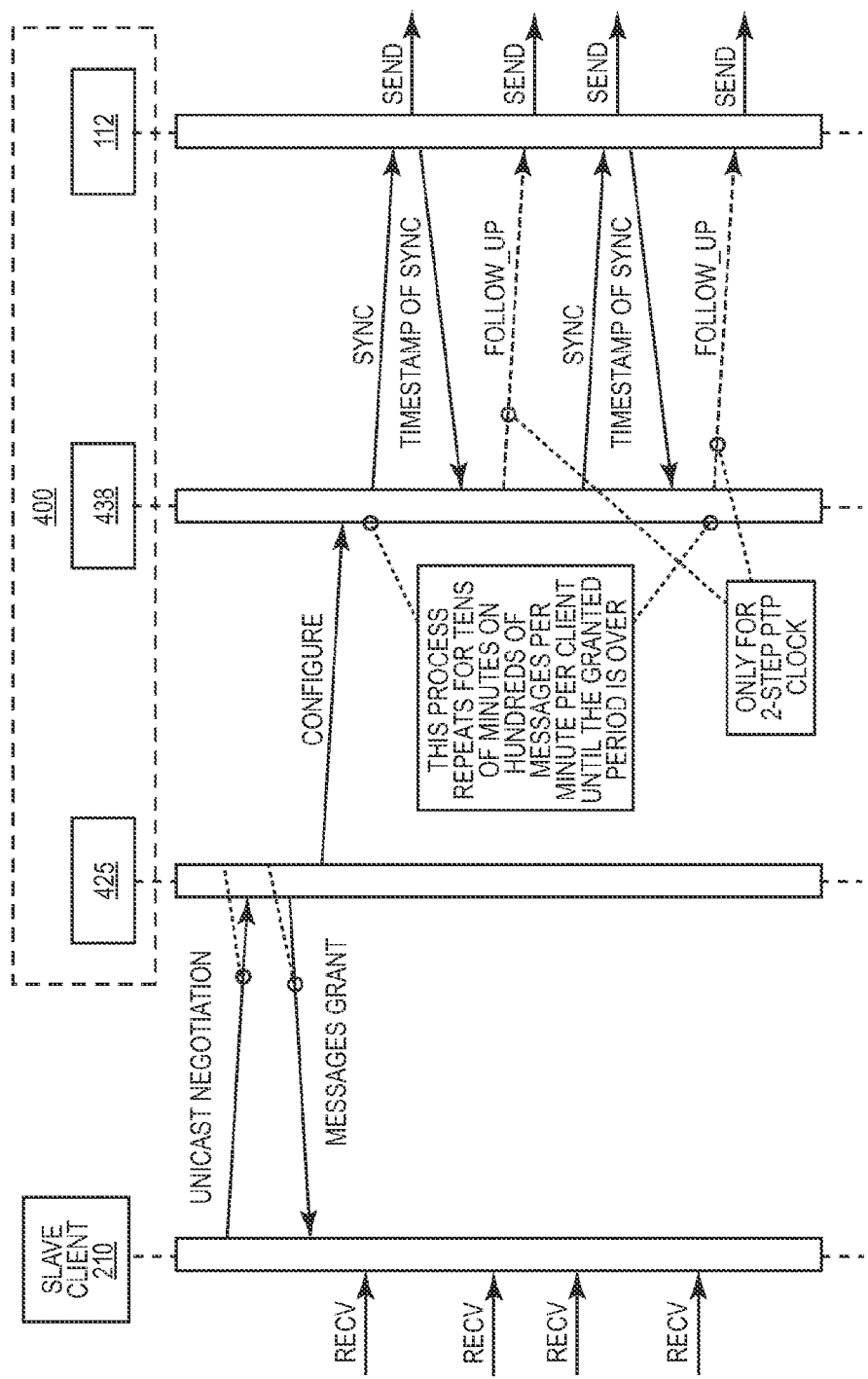
Figure 4C:
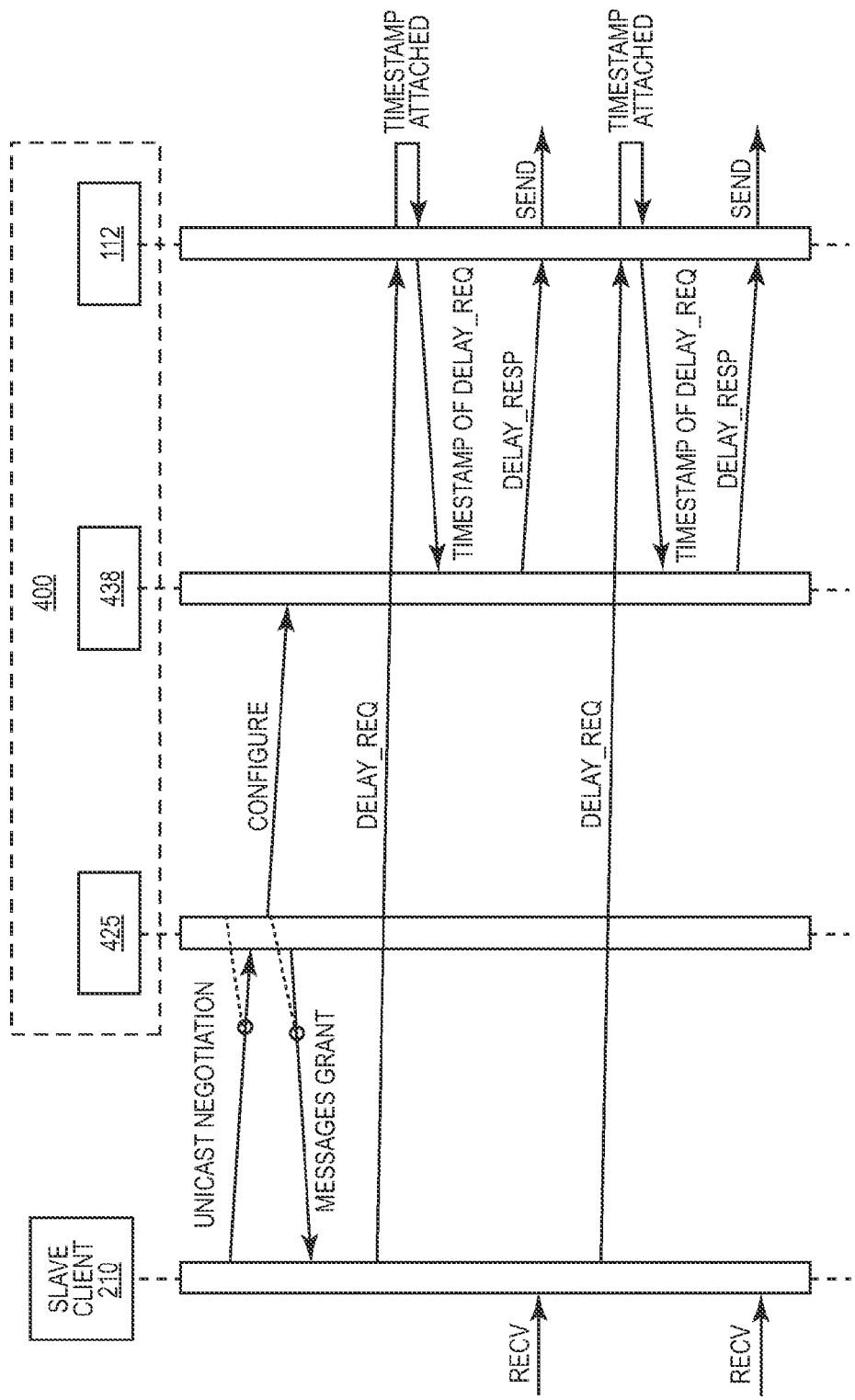

FIGS. 4A, 4B, and 4C illustrate detailed sequence diagrams for the handling of Announce, Sync, and Delay_Resp messages. In each of these sequence diagrams, it can be seen that the processing load on PPU 420 is significantly reduced, since the repetitive message handling is performed by the offloaded low-touch processing 438 in Egress Packet Processing unit 435, which resides on NPU 430. The high-touch processing 425 that remains in PPU 420 includes unicast negotiation and other management functions. High-touch processing unit 425 is also responsible for configuring low-touch processing unit 435, using one or more configuration messages. However, these messages are produced far less frequently than the resulting high-frequency PTP Event-Related Messages.

For instance, FIG. 4A illustrates a sequence diagram for the handling of Announce messages in some embodiments of the invention. Unicast negotiation between the data network node 400 and the slave client 210 is handled by high-touch processing 425, in PPU 420, just as it was in the data network node 100 of FIG. 1.

High-touch processing 425 also sets up low-touch processing unit 435, in NPU 430, by sending one or more configuration messages. Details of an example implementation of a configuration message will be given. Generally speaking, the configuration messages provide NPU 430 with enough information about a particular stream of PTP messages so that the NPU 430 can autonomously generate the entire sequence of repetitive messages. Thus, as seen in FIG. 4A, the Announce messages are generated by offloaded low-touch processing 435 and relayed to the slave client 210, via Hardware Timestamper 112, without message-by-message involvement from PPU 420. Note that although the Sync and Follow_Up sequence diagrams are drawn together, the internal mechanisms of the processing in the Network Processing Unit 430 are different, as will be discussed in further detail below.

FIGS. 4B and 4C illustrate corresponding sequence diagrams for the handling of Sync and Delay_Resp messages, respectively. Again, after an initial configuration of the offloaded low-touch processing 428, the high-touch Master Port processing 425 in PPU 420 need not be involved on a message-by-message basis in the subsequent sending of the repetitive messages. Because each stream of messages may include hundreds of messages, and because several clients may be handled simultaneously, the computing resources needed from PPU 420 to support Master Port functionality is dramatically reduced.

Each PTP master port holds configuration information for one or more streams, which may be static or dynamic. The example signal flows of FIGS. 4A, 4B, and 4C are based on the use of unicast negotiation, so the stream configuration is dynamic. After a negotiation with a particular slave client is completed, and some messages delivery is granted, the high-touch Master Port function 425 can download a PTP stream configuration to the offloaded low-touch Master Port function 438, thus enabling Egress Packet Processing unit 435 to autonomously generate PTP packets and/or responses by configured logic, with little or no subsequent involvement by PPU 420.

Figure 5:
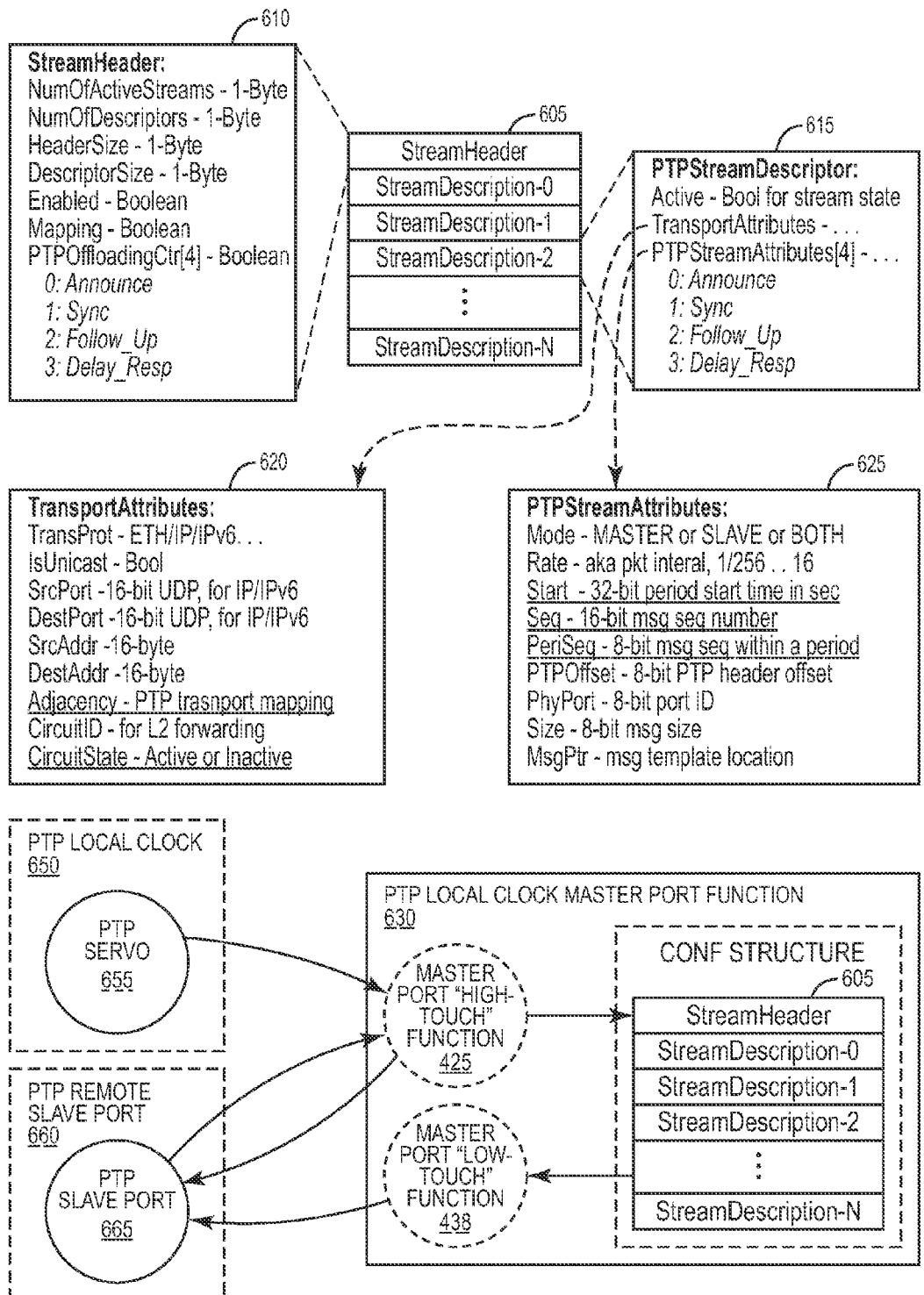
FIG. 5 illustrates an example control structure for PTP offloading.

In one example embodiment, the stream configuration is a structure CONF. The size of this structure is usually linear to the number of the streams configured by the configuration message, with each stream adding less than a couple of hundred bytes to the configuration message. FIG. 5 gives an example of such a control structure 605, which includes a stream header 610 and one or more PTP stream descriptors 615. The PTP stream descriptors 615 in turn include transport attributes 620 and PTP stream attributes 625, which together provide sufficient information for NPU to autonomously generate and send the repetitive PTP messages in a given stream. The encapsulation-related fields (encapsulation is referred to as "mapping" in ITU terminology) are routing specific, which applies to router type of application. In some embodiments, all or part of the CONF structure 605 is provided to the NPU by the PPU in one or more messages, while in other embodiments CONF structure 605 is a memory structure in the NPU that is maintained by configuration messages sent to the NPU from the PPU.

In some embodiments, a field is included in CONF structure 605 for each stream to enable or disable the offloading control on the stream for the offloaded master-port function 435. For unicast negotiation, whenever the grant time expires without a renewal of the contract by the slave port, the master port will disable the stream until re-negotiation happens. Accordingly, in some embodiments, configuration information for a disabled stream may be retained by off-loaded master port function 435, for at least some interval of time. In other embodiments, the disabling may also be implemented with a field or command indicating that the stream and its configuration should be deleted.

One responsibility of high-touch Master Port function 425 is to maintain the CONF up-to-date for the offloaded master port function 438 to use. This maintenance of the CONF structure is illustrated in the lower portion of FIG. 5, which generally illustrates the information flow involved in the overall master port functionality, shown in FIG. 5 as PTP Local Clock Master Port Function 630. As shown in FIG. 5, Master Port function 425, which resides in the PPU, maintains CONF structure 605 based on information received from the PTP local clock 650, which includes a PTP servo function 655, as well as information received from the remote slave port 660, via PTP slave port function 665. Offloaded master port function 438, residing in the NPU, uses information from the CONF structure to generate messages for relay to PTP remote slave port 660.

Examples of input information for maintaining the CONF are given below. Various embodiments may include some or all of these examples, and may include additional items of information not discussed here.

First, the CONF structure includes, explicitly or implicitly, a PTP message template for each message type of a stream, with all PTP-required information buried in as an opaque object for offloaded master port function 435 to consume. Accordingly, in some embodiments offloaded master port function 435 needs only to increase a sequence ID upon Announce and Sync message generation. The sequence ID is at fixed offset of a PTP message with 2-byte word in big-endian form. (Follow_Up sequenceId matches the corresponding Sync sequenceId, while Delay_Resp sequenceId matches the corresponding Delay_Req sequenceId.) In these embodiments, all other PTP-related information, such as clockQuality, priorities and currentUtcOffset, are all included in stream configuration data provided by high-touch master port function 425, and the offloaded master port function 435 does not need to have any involvement in the generation of this information.

Other information provided by high-touch master port function 425 includes user configuration for the PTP port. This covers transportation layer definition, port mastership, destination port description, above mentioned message template, and so on. Other information includes the unicast negotiated result—this covers message sending rate and is also reflected in the stream configuration data. Still further information might include management message information received from a management entity in the network.

Figure 6:
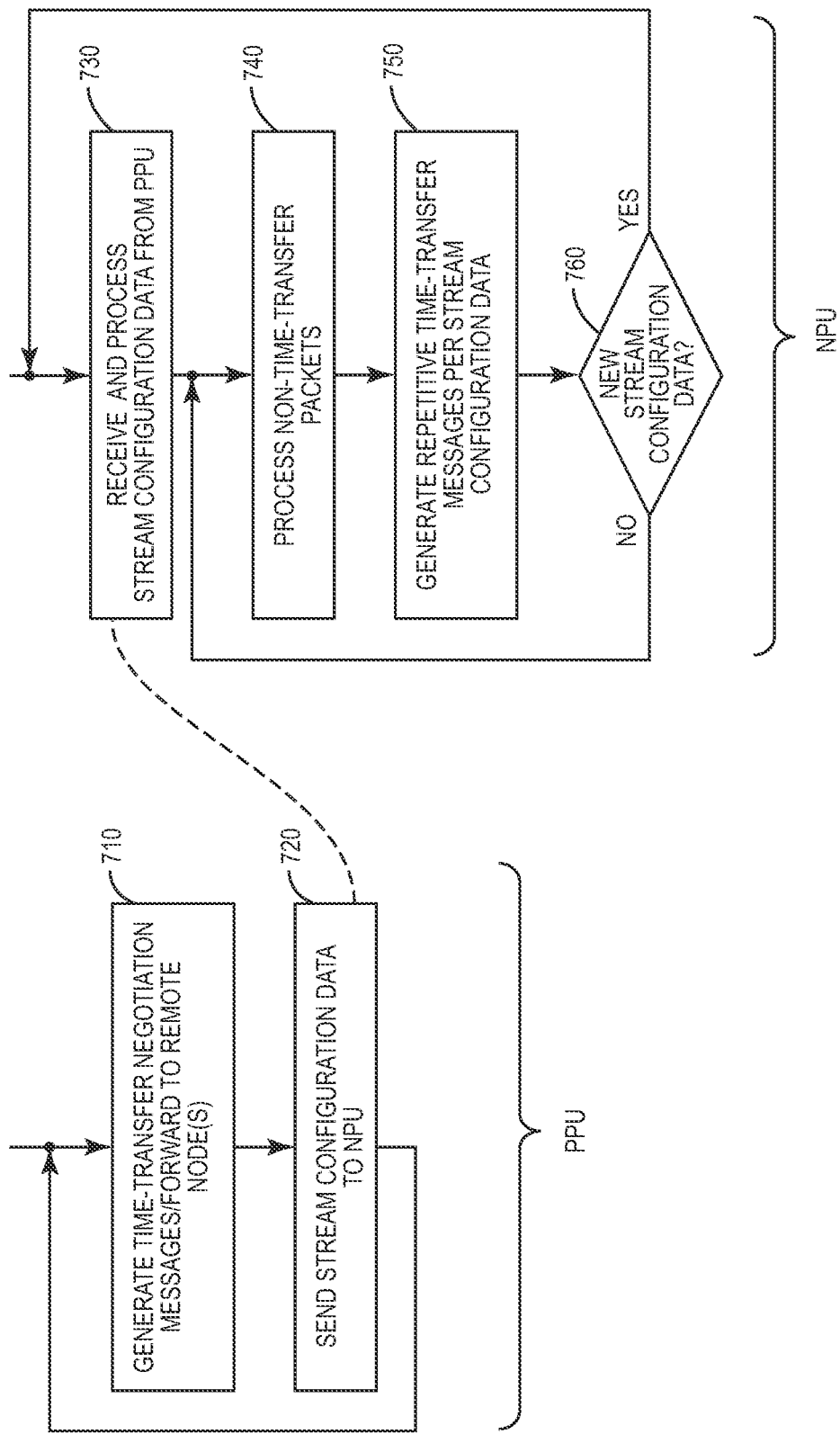
FIG. 6 is a process flow diagram illustrating an example method for supporting a time-transfer protocol in a network node having a time-transfer protocol processing unit and a network processor unit.

FIG. 6 is a process flow diagram illustrating an example technique for supporting a time-transfer protocol in a network node structured according to the previous discussion, i.e., having a time-transfer protocol processing unit and a network processor unit consisting of separate hardware resources from the time-transfer protocol unit. The left-hand side of the figure illustrates operations carried out by the protocol processing unit (PPU) while the right-hand side illustrates operations performed by the network processor unit (NPU).

As seen at block 710, the PPU, among other things, generates negotiation messages and management messages for the time-transfer protocol and forwards said negotiation and management messages to one or more remote network nodes. In unicast mode, these negotiation messages are generated in response to a negotiation initiated by the slave clock. As discussed above, these operations are "high-touch" operations. To support offloaded low-touch operations, the PPU also transfers one or more configuration messages to the network processor unit, as shown at block 720. The configuration messages include stream configuration data for a first type of repetitive time-transfer message, such as an Announce message or a Sync message.

As shown at block 730, the NPU receives the configuration message from the PPU and processes it. As described earlier, the data in the configuration message is used to set up the repetitive time-transfer messages.

Of course, a central responsibility of the NPU is to handle the low-touch processing of data packets that are unrelated to the time-transfer protocol. Thus, as shown at block 740, the NPU performs routing or switching operations on non-time-transfer data packets received from one or more line ports and transmitted on one or more backplane port, as well as non-time-transfer data packets received from the one or more backplane ports and transmitted on the one or more line ports. Generally speaking, these data packets do not carry time-transfer protocol timestamp data, although, of course, some of these data packets may include time-transfer protocol packets for use by another network node.

The NPU also handles the repetitive time-transfer messages. Thus, as shown at block 750, the NPU generates a plurality of time-transfer messages according to the first type of repetitive time-transfer messages, using the stream configuration data received from the PPU, and forwards the time-transfer messages to the remote network nodes, via the one or more line ports. This process is repeated, as shown at block 760, until it terminates normally (e.g., according to a configured number of repetitions, or until a new configuration message is received from the PPU.

The NPU can handle multiple types of repetitive time-transfer messages simultaneously, based on message stream-specific configuration data received from the PPU. Likewise, the NPU can handle messages for several remote slaves at the same time. Thus, in some cases, the configuration message discussed above includes additional stream configuration data corresponding to one or more additional types of repetitive time-transfer messages (alternatively, multiple configuration messages can be used), and the NPU generates additional time-transfer messages of each of the one or more additional types and forwards the additional time-transfer messages to the one or more remote network nodes.

Although the process illustrated in FIG. 6 and the techniques described herein are not necessarily so limited, in some cases the time-transfer protocol is compliant with the Precision Clock Synchronization Protocol specified by IEEE Standard 1588-2008. Thus, the type or types of time-transfer messages handled by the NPU can be any one or more of the following types specified by IEEE Standard 1588-2008: an Announce message; a Sync message; a Follow_Up message; and a Delay_Resp message.

In some cases and/or for some types of messages, generating the plurality of event messages in the NPU comprises inserting incremented sequence identifiers into successive messages of the same type and from the same stream. In some cases, this may require compensating a transport layer checksum or cyclic redundancy check (CRC) for such a PTP payload, according to transport protocol requirements, as a result of the changing sequence identifier.

In some cases and/or for some types of messages, the messages each comprise one or several time-transfer protocol fields, and the NPU generates the repetitive messages by copying the one or more time-transfer protocol fields from the stream configuration data to the generated messages. These fields might include, for example, a clock quality field, a priority field, and/or a universal time offset field.

It should be noted that while the above discussion is focused primarily on offloading of master port functionality, similar structures and similar techniques may be applied to the offloading of repetitive message handling for one or more time-transfer slave ports. Thus, for example, the handling of Delay_Req messages for one or more slave ports may be offloaded to an NPU using the technique illustrated in FIG. 6. Likewise, the offloading of slave port functionality may be accomplished by splitting the PTP Slave Port Function 126 pictured in FIG. 3 into a high-touch portion and a low-touch portion, and moving the low-touch portion into Network Process 430, just as was done for Master Port low-touch processing functionality 438.

Figure 7:
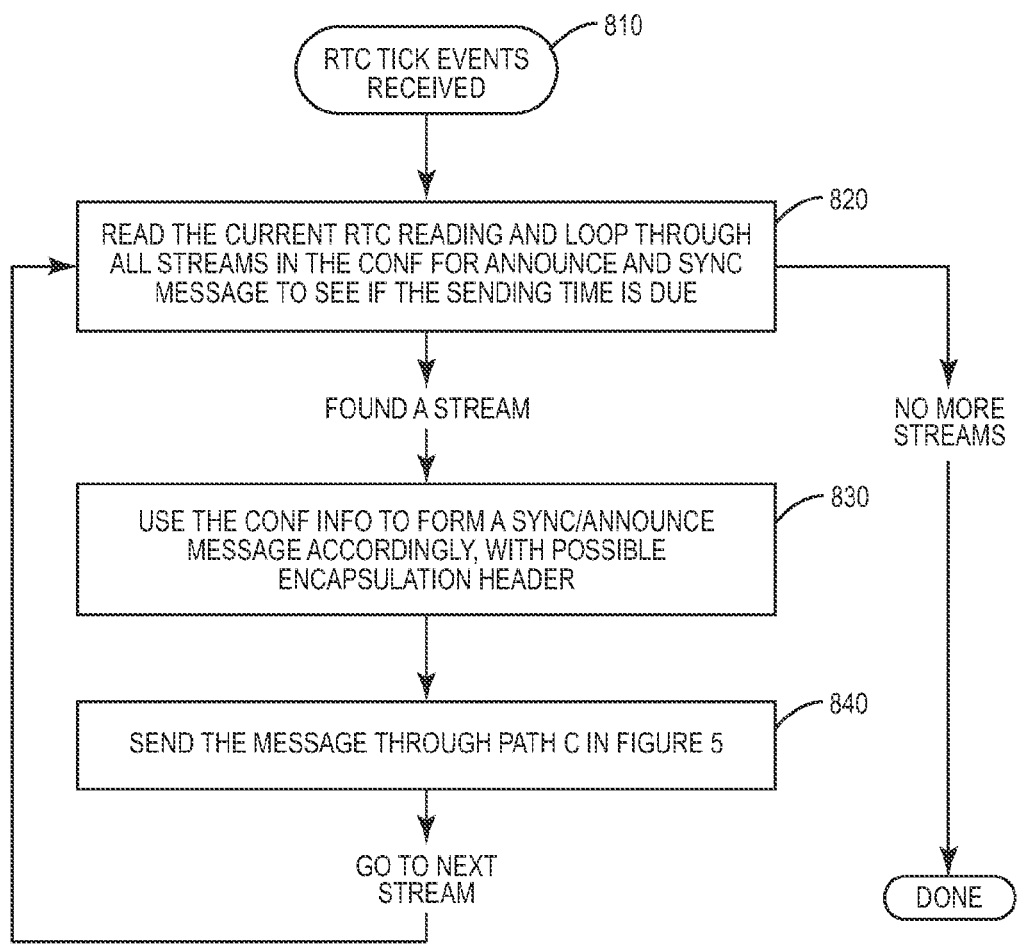
FIG. 7 illustrates an example technique for handling Announce and Sync messages.

The specific processing of a repetitive time-transfer message by the NPU will vary somewhat, depending on the message type. FIG. 7 illustrates example details of the handling of multiple message streams for one category of PTP messages: the Announce and Sync messages. Each message flow is partitioned into periods, where period is one cycle of the handling. For message rates higher than 1 message per second, the period can be one second, for example. For lower message rates, it can be convenient to simply set the period to the sending interval.

Each time a real-time clock (RTC) tick event arrives at the NPU, as shown at block 810, the NPU needs to identify the current offset relative to the start of the period. This way, the sent messages can be evenly distributed across the whole period without other complication when to send a message. As shown at block 820, the NPU reads the current RTC value and loops through all currently configured streams (as indicated by the CONF structure, for example) to see if the sending time for any Announce and/or Sync messages is due. If the NPU finds a stream that has a message due for sending, the NPU uses the CONF information to form the message, as shown at block 830; this may include the addition of an encapsulation header, such as an IP header, so that the message formed by the NPU is ready to be delivered without further processing by a general-purpose processor. The message is then sent to the remote slave client, via the PTP hardware processing engine. (See path C in FIG. 3, for example.)

Figure 10:
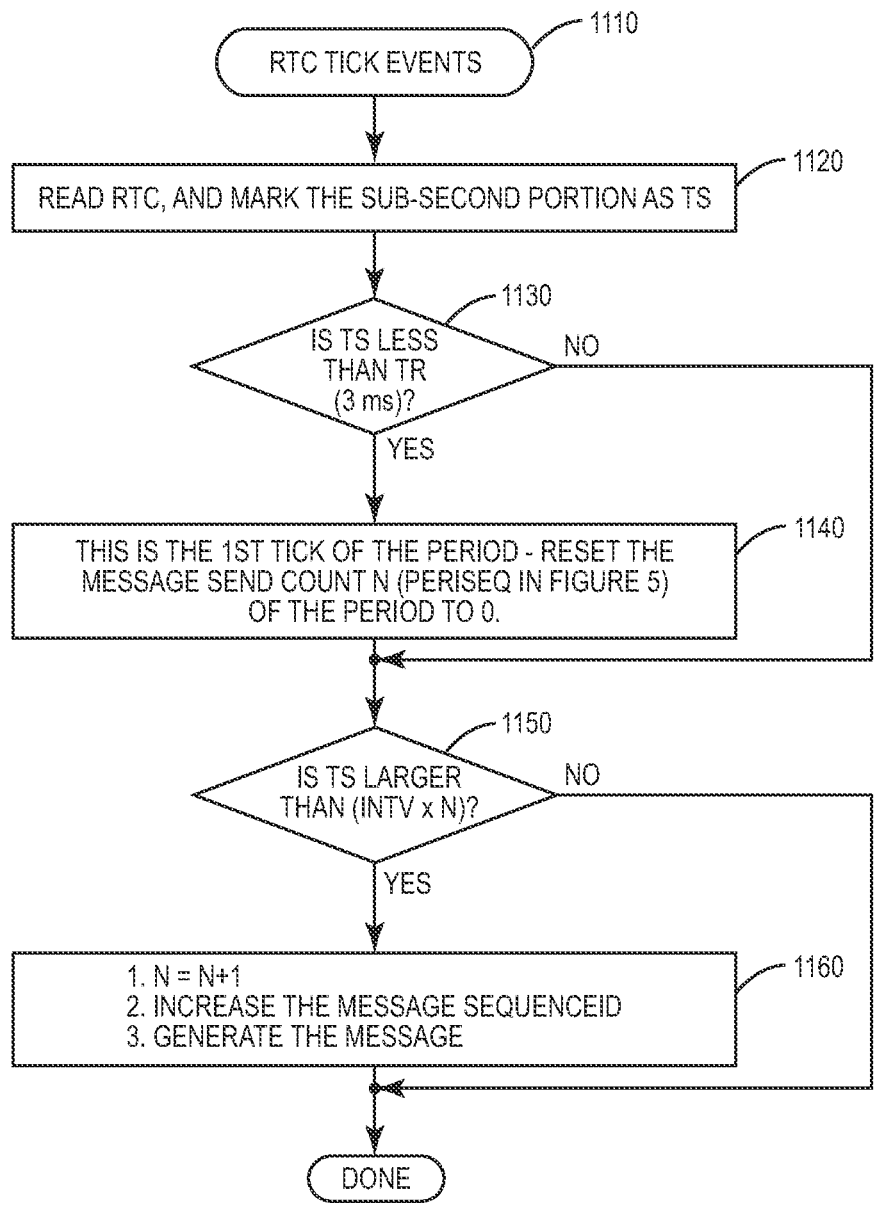
FIG. 10 illustrates a process for generating repetitive Announce and Sync messages.

FIG. 10 illustrates details of one example approach to evenly distributing the repetitive messages for a given stream across the sending period. It will be appreciated, however, that other techniques may be used. First, some example numbers to illustrate how the process works are given. Assume, for example, that the Sync message rate is required to be 128 messages per second and that the RTC tick granularity is 3 milliseconds. The period can be one second.

When the first tick comes in, as shown at block 1110 the offloaded PTP master port function 438 reads the RTC, as shown at block 1120, and records the sub-second portion of the RTC. The RTC tick in a NPU is usually handled by generating a special RTC event message. Since the generation and delivery of this message to the offloaded master port function requires a little bit of time, the RTC tick should periodically land on the boundary of a second, with a little more extra as the data path latency. However, the latency is usually small enough, e.g., in microseconds level, to avoid any significant problems. Let TS denote the sub-second portion of the RTC reading. The NPU first checks whether the TS is smaller than a tick period of 3 milliseconds (shown as "TR" in the figure), as shown at block 1130, to determine whether we are at the beginning of a period. The tick period should be small enough to handle the highest expected rate of message generation. Thus, for example, if a maximum expected message rate is 128 messages per second, the maximum tick period is about $1000/(128\times2)$, or about 4 milliseconds. Other values can be used, of course, but 3 milliseconds is good enough for this algorithm and is large enough for an efficient hardware implementation. Since TS is smaller than one sending interval (INTV=1000/128 milliseconds), a sending sequence number N is reset to 0 to mark the beginning of the processing for this period, as shown at block 1140.

Then, for every RTC tick, including the first one, the TS is compared to a target time TT, as shown at block 1150. The target time is computed as TT=INTV×N. If TS exceeds the target time, N and a message sequenceId are incremented, as shown at block 1160, and the message is sent. Otherwise, the message handling for this tick is completed.

This algorithm will evenly distribute the message generation, and requires less state handling logic in the network processor, which is optimized for handling low-touch packets. The algorithm can also tolerate jitters in the RTC tick rate.

Figure 8:
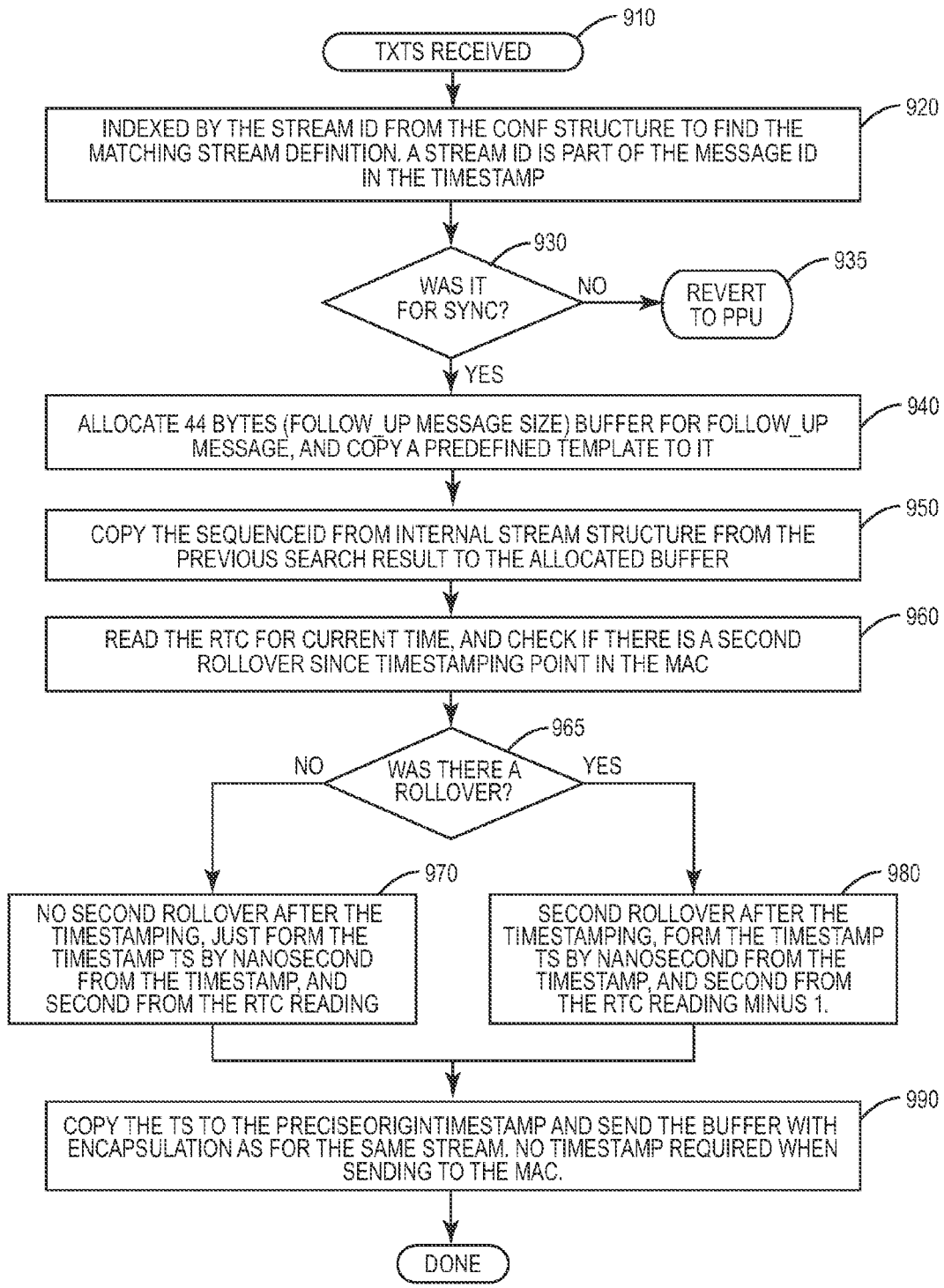
FIG. 8 illustrates an example technique for handling Follow_Up messages.

FIG. 8 illustrates example details of the handling of another category of PTP messages: the Follow_Up message. This process is triggered by the receipt, at the NPU, of a transmit time-stamp (TxTs), as shown at block 910. A stream identifier can be used to determine which stream the time-stamp belongs to. As shown at block 920, this stream identifier is used to index the configuration data (e.g., the CONF structure), to find the corresponding stream definition. The NPU then checks to determine whether the time-stamp is for a Sync message, as shown at block 930. If not, then the NPU defers to the PPU for further processing. If the time-stamp is for a Sync message, on the other hand, the process continues, as shown at block 940, with the allocating of a buffer for the Follow_UP message and the copying of a predefined template to the buffer. The predefined template is taken from the CONF structure, in some embodiments.

Next, as shown at block 950, the sequenceId from the stream configuration data (see PTPStreamAtrributes 625 in FIG. 5, for example) is copied to the allocated buffer. The NPU checks the RTC for the current time, as shown at block 960, and checks whether there has been a rollover of a one-second interval since the Sync message was time-stamped, as shown at block 965. If not, the timestamp to be included in the Follow_Up message is formed from the nanosecond-resolution of the received time-stamp and the current one-second resolution reading from the RTC, as shown at block 970. If there has been a one-second rollover, on the other hand, the timestamp to be included in the Follow_Up message is formed from the received time-stamp and the current one-second resolution reading from the RTC reduced by one second, as shown at block 980. Finally, as shown at block 990, the time-stamp thus formed is copied to the preciseOriginTimestamp field of the Follow_Up and the buffer is processed for sending to the remote slave client, as shown at block 990. This processing may include encapsulation. Note that the Follow_Up message does not need to be time-stamped upon sending.

Figure 9:
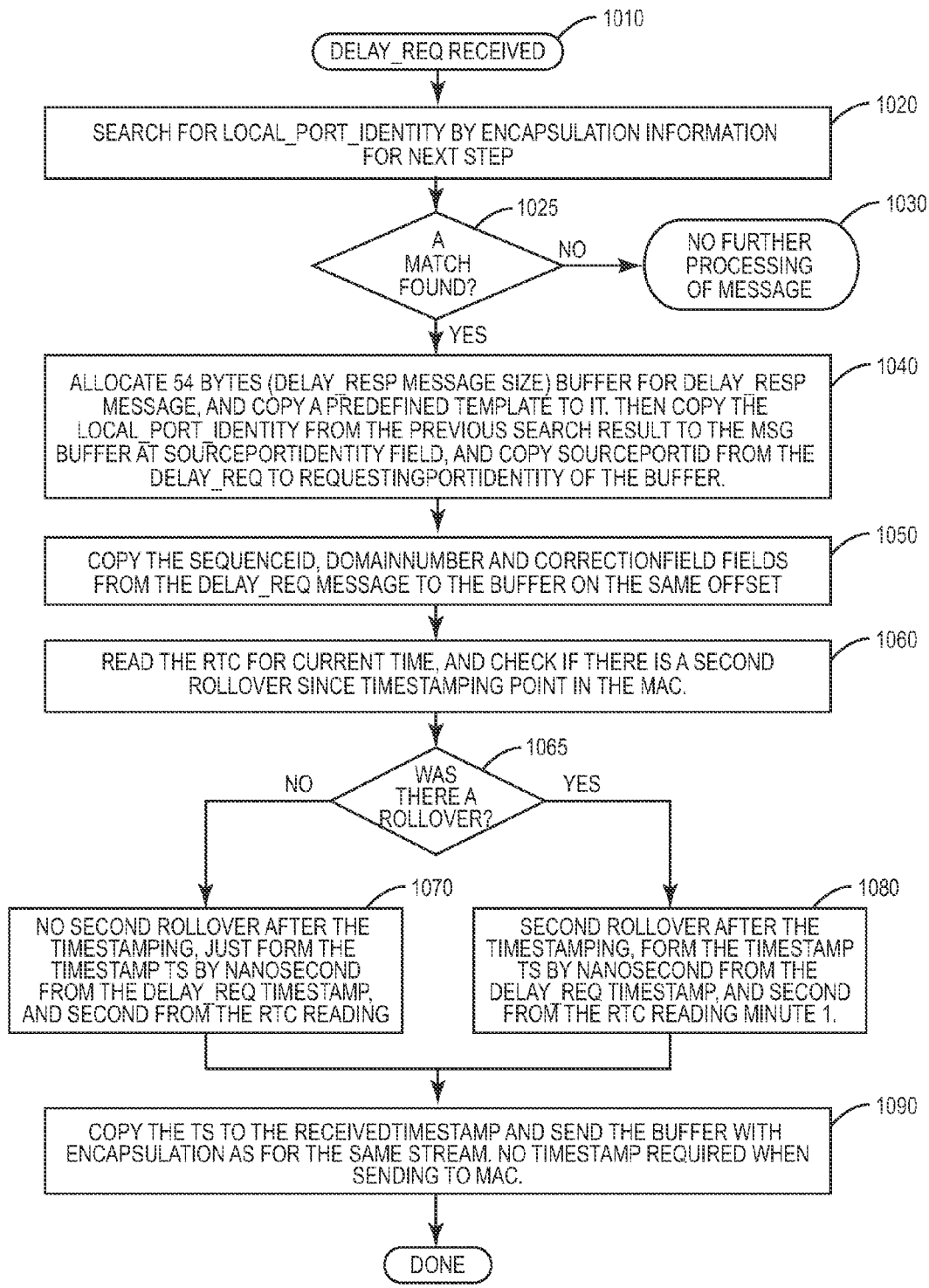
FIG. 9 shows an example technique for processing Delay_Resp messages.

FIG. 9 illustrates a very similar example procedure, but for handling Delay_Resp messages. This process is triggered by the receipt of a Delay_Req message, as shown at block 1010. The encapsulation information for the Delay_Req message is used to search for a local port identity corresponding to the message, as shown at blocks 1020 and 1025. If no match is found, then no further processing is required by the NPU, as shown at block 1030. If a match is found, however, then processing continues, as shown at block 1040, with the allocation of a buffer for the Delay_Resp message and the copying of a predefined template to the buffer. The predefined template is taken from the CONF structure, in some embodiments.

Next, as shown at block 1050, the sequenceId, domainNumber and correctionField fields from the Delay_Req are copied to the allocated buffer. The NPU checks the RTC for the current time, as shown at block 1060, and checks whether there has been a rollover of a one-second interval since the Delay_Req message was time-stamped, as shown at block 1065. If not, the timestamp to be included in the Delay_Resp message is formed from the nanosecond-resolution of the received time-stamp and the current one-second resolution reading from the RTC, as shown at block 1070. If there has been a one-second rollover, on the other hand, the timestamp to be included in the Delay_Resp message is formed from the received time-stamp and the current one-second resolution reading from the RTC reduced by one second, as shown at block 1080. Finally, as shown at block 1090, the time-stamp thus formed is copied to the receivedTimestamp field of the Delay_Resp and the buffer is processed for sending to the remote slave client, as shown at block 990. This processing may include encapsulation. Again, note that the Delay_Resp message does not need to be time-stamped upon sending.

With the techniques described above, the efficient packet-handling capability of a network processor can be more fully exploited by moving the higher-rate, lower-touch, PTP packet processing functions of a PTP boundary clock master port from the PTP Protocol Engine into the network processor, reducing the processing load on the PTP processor and increasing the capacity of a network to handle additional PTP clients.

As will be readily understood by those familiar with network device design, several of the various functional blocks of the data network nodes described herein, such as the example network node 400 of FIG. 3, may be implemented using digital logic and/or one or more microcontrollers, microprocessors, or other digital hardware. Several of the illustrated functions may be implemented together, such as in a single application-specific integrated circuit (ASIC), or in two or more separate devices with appropriate hardware and/ or software interfaces between them. Further, several of the functional elements of data network node may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network devices will appreciate the cost, performance, and maintenance tradeoffs inherent in these design choices.

With these and other variations and extensions of the present invention in mind, it should be appreciated that the foregoing description and the accompanying drawings represent non-limiting examples of the methods and apparatus taught herein for managing a time-transfer protocol in a data network node. As such, the inventive apparatus and techniques taught herein are not limited by the foregoing description and accompanying drawings. Instead, the present invention is limited only by the following claims and their legal equivalents.

What is claimed is:

1. A network node for packet data processing, the network node comprising:
   a time-transfer protocol processing unit adapted to generate negotiation messages and management messages for a time-transfer protocol and to forward said negotiation and management messages to one or more remote network nodes, via one or more line ports, and
   a network processor unit consisting of separate hardware resources from the time-transfer protocol processing unit and adapted to
      perform routing operations, or switching operations, or both, on first data packets received from the one or more line ports and transmitted on one or more backplane ports and second data packets received from the one or more backplane ports and transmitted on the one or more line ports, wherein the first and second data packets do not include time-transfer protocol timestamp data;
      receive a configuration message from the time-transfer protocol processing unit, the configuration message comprising stream configuration data for a first type of repetitive time-transfer message;
      generate a plurality of time-transfer messages according to the first type of repetitive time-transfer message, using the stream configuration data;
      forward said plurality of time-transfer messages to the one or more remote network nodes, via the one or more line ports;
      wherein the network processor unit is adapted to generate the plurality of time-transfer messages of the first type by inserting incremented sequence identifiers into successive ones of the time-transfer messages;
      wherein the time-transfer messages each comprise a time-transfer protocol field that is copied from the stream configuration data and unchanged by the network processor unit;
      wherein the time-transfer protocol field is one of a clock quality field, a priority field, and a universal time offset field.

2. The network node, wherein the configuration message comprises additional stream configuration data corresponding to one or more additional types of repetitive time-transfer messages, and wherein the network processor unit is further adapted to generate additional time-transfer messages of each of the one or more additional types, based on the additional stream configuration data, and to forward the additional time-transfer messages to the one or more remote network nodes.

3. The network node of claim 1, wherein the time-transfer protocol is compliant with the Precision Clock Synchronization Protocol specified by IEEE Standard 1588-2008.

4. The network node of claim 3, wherein the first type of repetitive time-transfer message is one of the following types specified by IEEE Standard 1588 2008:
   an Announce message;
   a Sync message;
   a Follow_Up message;
   a Oelay_Req message; and
   a Delay_Resp message.

5. A method for supporting a time-transfer protocol in a network node having a time-transfer protocol processing unit and a network processor unit consisting of separate hardware resources from the time-transfer protocol unit, the method comprising:
   generating negotiation messages and management messages for the time-transfer protocol, using the time-transfer protocol processing unit, and forwarding said negotiation and management messages to one or more remote network nodes, via one or more line ports;
   performing routing or switching operations, or both, on first data packets received from the one or more line ports and transmitted on one or more backplane ports and second data packets received from the one or more backplane ports and transmitted on the one or more line ports, wherein the first and second data packets do not include time-transfer protocol timestamp data, using the network processor unit;
   transferring a configuration message from the time-transfer protocol processing unit to the network processor unit, the configuration message comprising stream configuration data for a first type of repetitive time-transfer message;
   generating, with the network processor unit, a plurality of time-transfer messages according to the first type of repetitive time-transfer messages, using the stream configuration data;
   forwarding said plurality of time-transfer messages to the one or more remote network nodes, via the one or more line ports;
   wherein generating the plurality of time-transfer messages of the first type comprises inserting incremented sequence identifiers into successive ones of the time-transfer messages;
   wherein the time-transfer messages each comprise a time-transfer protocol field, and wherein generating the plurality of time-transfer messages of the first type comprises copying the time-transfer protocol from the stream configuration data to the time-transfer messages of the first type; and
   wherein the time-transfer protocol field is one of a clock quality field, a priority field, and a universal time offset field.

6. The method of claim 5, wherein the configuration message comprises additional stream configuration data corresponding to one or more additional types of repetitive time-transfer messages, and wherein the method further comprises generating additional time-transfer messages of each of the one or more additional types, based on the additional stream configuration data, using the network processor, and forwarding the additional time-transfer messages to the one or more remote network nodes.

7. The method of claim 5, wherein the time-transfer protocol is compliant with the Precision Clock Synchronization Protocol specified by IEEE Standard 1588-2008.

8. The method of claim 7, wherein the first type of repetitive time-transfer message is one of the following types specified by IEEE Standard 1588-2008:
   an Announce message;
   a Sync message;
   a Follow_Up message;
   a Delay_Req message; and
   a Delay_Resp message.

* * * * *

UNITED STATES PATENT AND TRADEMARK OFFICE
CERTIFICATE OF CORRECTION

PATENT NO.        : 8,879,552 B2                                            Page 1 of 1
APPLICATION NO.   : 13/402773
DATED             : November 4, 2014
INVENTOR(S)       : Zheng et al.

It is certified that error appears in the above-identified patent and that said Letters Patent is hereby corrected as shown below:

In the Claims

In Column 14, Line 65, in Claim 2, delete "node," and insert -- node of claim 1, --, therefor.

In Column 15, Line 15, in Claim 4, delete "Oelay_ Req" and insert -- Delay_Req --, therefor.

Signed and Sealed this
Twenty-sixth Day of May, 2015

Michelle K. Lee
*Director of the United States Patent and Trademark Office*